COMPARATOR CIRCUIT

Filed Aug. 29, 1967

JOHN W. EVERLY
BARRY S. TODD
*INVENTORS*

BY J. M. St. Amand
*ATTORNEY*

United States Patent Office 3,508,073
Patented Apr. 21, 1970

3,508,073
COMPARATOR CIRCUIT

John W. Everly and Barry S. Todd, Corona, Calif., assignors to the United States of America as represented by the Secretary of the Navy Filed Aug. 29, 1967, Ser. No. 664,220
Int. Cl. H03k 5/20
U.S. Cl. 307—231 3 Claims

ABSTRACT OF THE DISCLOSURE

A circuit for obtaining the absolute value of the difference between two input signals consisting of a differential amplifier having small thermal drift and whose voltage gain and frequency response are controlled by simple feedback components; the two outputs of the differential amplifier are connected to the bases of two emitter followers whose emitters drive a common load without any rounding at the decision point.

The invention herein described may be manufactured and used by or for the Government of the United States of America for governmental purposes without the payment of any royalties thereon or therefor.

The purpose of the present invention is to electronically provide the mathematical absolute value of a difference between two input signals with a greater accuracy and higher frequency response than available from the prior art.

Existing prior art circuits use diodes for the absolute value process. However, diodes vary in forward voltage drop from unit to unit and require a high impedance load which must subsequently be transformed to a lower impedance by a cathode follower or emitter follower so as to adequately drive the succeeding stage with proper gain and frequency response. A low impedance load on the diodes causes "rounding" at the decision point, as shown in the curve of FIG. 1. Also, existing circuits using discrete (i.e., not integrated) components must be carefully constructed to achieve maximum symmetry and D.C. stability between channels, and high frequency performance is limited therein. Further, previous circuits such as U.S. Patent Nos. 2,822,474 issued Feb. 4, 1958; 3,001,088 issued Sept. 19, 1961 and 3,039,995 issued May 8, 1962 permit only one input, do not use differential amplifiers, do not involve linear signals and in some instances must exceed a threshold before response, or are subject to gain variations.

The present invention overcomes the aforementioned disadvantages of the prior art devices and provides a more simplified circuit in that no time for temperature compensation or gain matching is required during construction and at the same time provides greatly improved temperature characteristics.

FIG. 1 compares the graphical relationship between input difference and output for both the prior art devices and for the present invention shown in FIG. 2.

The circuit of this invention is particularly suited to analog signal inputs and provides the absolute value of the difference between the two analog signals.

The circuit of the present invention consists of a differential-input differential-output operational amplifier A having two inputs, and two outputs. A typical such operational amplifier is model SN523A made by Texas Instruments. The outputs of operational amplifier A are connected to a pair of emitter followers $Q_1$ and $Q_2$ which are connected to a common load resistor $R_L$ and output. $V_1$ and $V_2$ are the two input signals fed to operational amplifier A. $V_3$ and $V_4$ are the amplified values of the quantities $V_1$ minus $V_2$ and $V_2$ minus $V_1$ respectively. If $V_3$ is more positive than $V_4$, NPN transistor $Q_1$ will conduct presenting $V_3$ at the output $V_0$. NPN transistor $Q_2$ does not conduct in this case because its base is more negative with respect to its emitter than $Q_1$. Conversely, if $V_4$ is more positive than $V_3$, transistor $Q_2$ will conduct presenting $V_4$ at the output $V_0$. Mathematically:

$$V_3=(V_1-V_2)$$
$$V_4=(V_2-V_1)=-(V_1-V_2)$$

Hence $$V_4=-V_3$$

The circuit output, $$V_0=\begin{cases}V_3 \text{ if } V_3>0\\ V_4 \text{ if } V_4>0\end{cases}$$
$$=\begin{cases}V_3 \text{ if } V_3>0\\ -V_3 \text{ if } V_3<0\end{cases}$$
$$=\begin{cases}V_1-V_2 \text{ if } V_1-V_2>0\\ V_2-V_1 \text{ if } V_1-V_2<0\end{cases}$$
$$V_0=|V_1-V_2|$$

Figure 1:
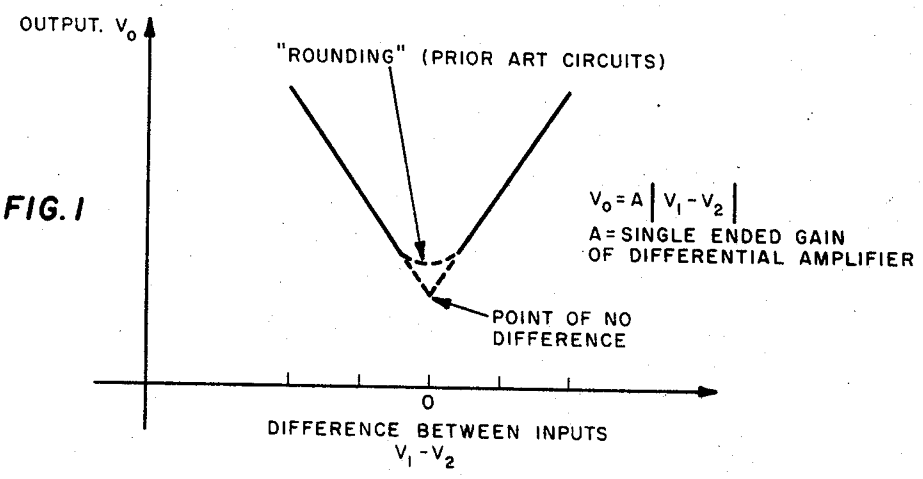
Figure 2:
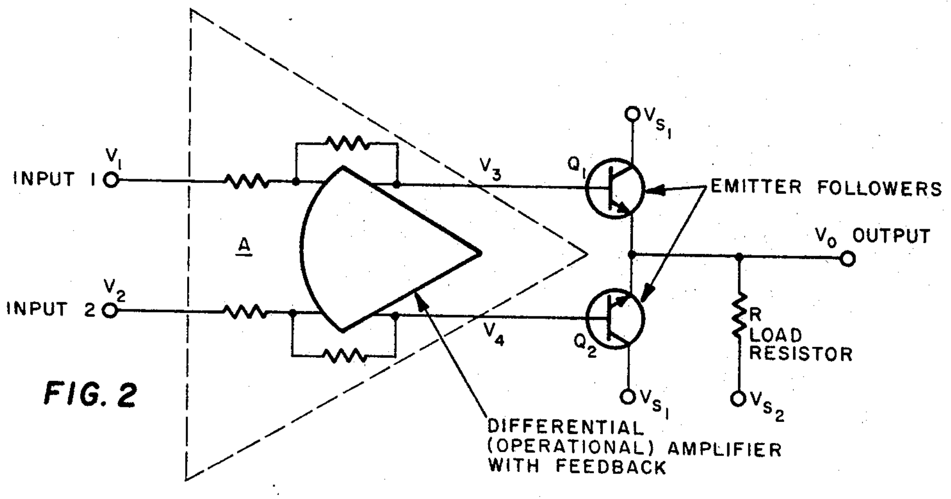
FIG. 2 is a circuit diagram of an embodiment of this invention.
Figure 3:
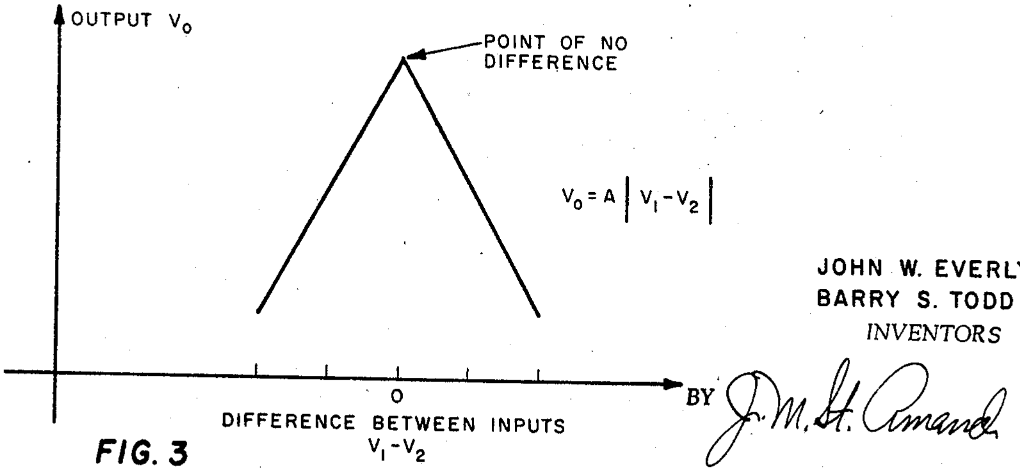
FIG. 3, shows the graphical relationship between input difference and output for the device of the present invention where PNP transistors are used in place of NPN transistors in FIG. 2.

As shown in FIG. 1, rounding is eliminated at the decision point by the circuit of the present invention. The emitter follower configuration provides current gain so that no additional impedance transformation need be necessary and also a sharp decision point as shown in FIG. 1.

Where a relationship such as shown in FIG. 3 is desired, PNP instead of NPN emitter followers may be used. This merely makes the point of no difference the most positive point on the graph instead of the most negative as shown in FIG. 1.

The two emitter followers $Q_1$ and $Q_2$ with a common load $R_L$ adequately drive a low impedance load without any rounding at the decision point. The differential operational amplifier A can be chosen with desired frequency range and small thermal drift, and voltage gain and frequency response is easily controlled.

Obviously many modifications and variations of the present invention are possible in the light of the above teachings. It is therefore to be understood that within the scope of the appended claims the invention may be practiced otherwise than as specifically described.

What is claimed is:

1. A comparator circuit for obtaining the mathematical absolute value of the difference between two input signals without rounding at the decision point, comprising:

(a) a differential-input differential-output operational amplifier having two analog signal inputs and two outputs, matched gain, high stability, and small thermal drift, (b) a pair of emitter followers, one having its base connected to one of said two amplifier outputs and the other emitter follower having its base connected to the other of said two amplifier outputs, (c) a common load resistor, and a circuit output, (d) the emitters of said emitter followers being coupled and connected to said common load resistor and the circuit output, and provide desired current gain without additional impedance transformation and a sharp decision point, the output voltage obtained at the circuit output being the mathematical absolute value of the difference between the two input signals, (e) feedback between the two inputs and two outputs of said operational amplifier are provided to readily control the voltage gain and frequency response of said amplifier.

2. A device as in claim 1 wherein said emitter followers are NPN transistors.

3. A device as in claim 1 wherein said emitter followers are PNP transistors.

References Cited

UNITED STATES PATENTS

| | | | |
|---|---|---|---|
| 3,309,538 | 3/1967 | Ashley et al. ------ | 328—117 X |
| 3,399,357 | 8/1968 | Weilerstein. | |
| 3,419,809 | 12/1968 | Lach et al. | |

DONALD D. FORRER, Primary Examiner

R. C. WOODBRIDGE, Assistant Examiner

U.S. Cl. X.R.

307—235; 328—117, 146; 330—30, 69